May 5, 1970  D. W. CARMODY  3,510,167
METHODS OF SOLUTION MINING
Filed Aug. 19, 1968  2 Sheets-Sheet 1

Donald W. Carmody
Inventor
Koenig, Senniger, Powers and Leavitt,
Attorneys

United States Patent Office 3,510,167
Patented May 5, 1970

3,510,167
METHODS OF SOLUTION MINING
Donald W. Carmody, Manistee, Mich., assignor to Hardy Salt Company, St. Louis, Mo., a corporation of Missouri
Filed Aug. 19, 1968, Ser. No. 765,740
Int. Cl. E21b 43/28
U.S. Cl. 299—4                                    10 Claims

ABSTRACT OF THE DISCLOSURE

A method of solution mining salt or other soluble minerals is described wherein the salt lies in a plurality of subterranean layers or beds separated by layers of insoluble material. The salt is mined in a lower salt bed by drilling spaced injection and production wells, hydraulically fracturing the salt bed between the wells, forcing a fluid through the injection well to dissolve the salt and form a cavity in that bed, and removing a salt saturated solution through the production well. Either before or after short-circuiting occurs in the cavity in the first salt bed, the injection well casing is milled off or perforated at a second higher salt bed for circulation of the fluid from the injection well to the second salt layer and back to the injection well. The salt is dissolved in the second bed and a salt saturated solution from the second bed is removed through the injection well, the cavity formed in the first bed, and the production well.

Background of the invention

This invention relates to methods of solution mining soluble minerals such as salt.

Salt, or salt bearing materials, and other soluble minerals, such as trona and potash, are found in many areas occurring in a series of subterranean layers or beds, each bed ranging from ten to several hundred feet thick separated by layers of limestone or dolomite rock of various thicknesses. The salt is typically mined by drilling spaced injection and production wells to a particular salt bed, hydraulically fracturing that bed at or near its lower interface with an insoluble rock layer thereby to provide communication between the wells, and forcing a fluid solvent, such as water, into the injection well to dissolve the salt in that layer, thereby producing a saturated salt solution from the production well. As the flow of water from the injection well to the production well proceeds, a morning-glory-shaped cavity is formed beginning at the injection well, where dissolving of the salt is more rapid because of contact with fresh water. This cavity gradually enlarges and develops. Since fresh water is lighter than salt water or brine, there is a tendency after initial development of the cavity for the water to work up towards the top of the salt bed generally in an up-dip direction until it reaches the rock layer above the salt. When the rock layer is reached, the water continues to work its way toward the production well until a short-circuit is said to occur wherein the fresh water proceeds along the roof of the salt layer at the rock interface resulting in unsaturated brine at the production well or a drastic reduction in the capacity of the two well system. Thus, although a substantial quantity of salt remains in the salt layer around the production well, the path of the water flowing between the wells is such that full saturation cannot occur. Hence, it is generally economically impractical to continue mining of salt from these two wells, and following typical present practices an additional well or wells must be added or hydraulic fracturing attempted in other salt beds from the same wells. However, the cost of drilling additional wells is a major expense in any hydraulic mining operation, and attempts at hydraulic fracturing are also costly and not always successful.

Methods of overcoming short-circuiting have been proposed in an attempt to dissolve a greater proportion of salt per well drilled. One of such methods is to drill a third well between the injection and production wells to a point above the short-circuited cavity, and to thereafter pressurize the third well to cause caving of higher salt and rock layers into the cavity. By caving upper salt beds or layers in this manner, a quantity of dissolvable salt, as well as rock, is deposited in the cavity between the wells and the path of the injected fluid is altered so that short-circuiting is somewhat reduced. Although this method of minimizing the short-circuiting problem may have application in certain geographical areas where the salt beds are closely spaced, it cannot be used where the salt beds are separated by thick layers of rock. For example, in certain areas where solution mining of salt is conducted, the horizontal salt beds are separated by 100 to 150 feet of solid rock which cannot be caved in with reasonable hydraulic pressures. In addition, the expense of drilling a third well may prove to be prohibitively high.

Summary of the invention

Among the several objects of this invention may be noted the provision of a method of solution mining minerals, such as salt, wherein a higher proportion of the mineral is removable per well drilled than with prior mining methods; the provision of such a method wherein short-circuited wells may still be economically utilized; the provision of such a method wherein a plurality of successive mineral beds may be mined from the original injection and production wells without necessitating the drilling of new wells for each bed; the provision of such a method wherein a mineral saturated solution is produced at the output of the production well, which solution is of high quality with a minimum of contaminants; and the provision of such a method which is characterized by simplicity of execution and economy of production. Other objects and features will be in part apparent and in part pointed out hereinafter.

Briefly, the method of this invention for solution mining soluble minerals lying in a plurality of subterranean beds separated by layers of substantially insoluble material comprises the steps of drilling spaced injection and production wells into a lower mineral bed, and establishing fluid communication between the wells, for example, by conventional hydraulic fracturing procedures. A fluid solvent is forced from the injection well to the production well to dissolve the mineral in the lower bed and to produce a substantially mineral saturated solution at the production well, the continued flow of the fluid solvent gradually forming a cavity in the lower mineral bed extending toward the production well along the upper portion of the lower bed to cause a short-circuit between the wells. Fluid communication is then established between the injection well and a second higher mineral layer for circulation of the fluid from the injection well to the second mineral layer. The mineral is dissolved in the second layer to produce a substantially mineral saturated solution from the second layer, and this saturated solution is returned to the injection well for removal through the injection well, the cavity and the production well. Thus, the cavity in the lower layer is used as a conduit for removal of the solution from the second layer, thereby minimizing the need for drilling additional wells and further fracturing between wells.

Brief description of the drawings

Corresponding reference characters indicate corresponding parts throughout the several views of the drawings.

Description of the preferred embodiments

Figure 1:
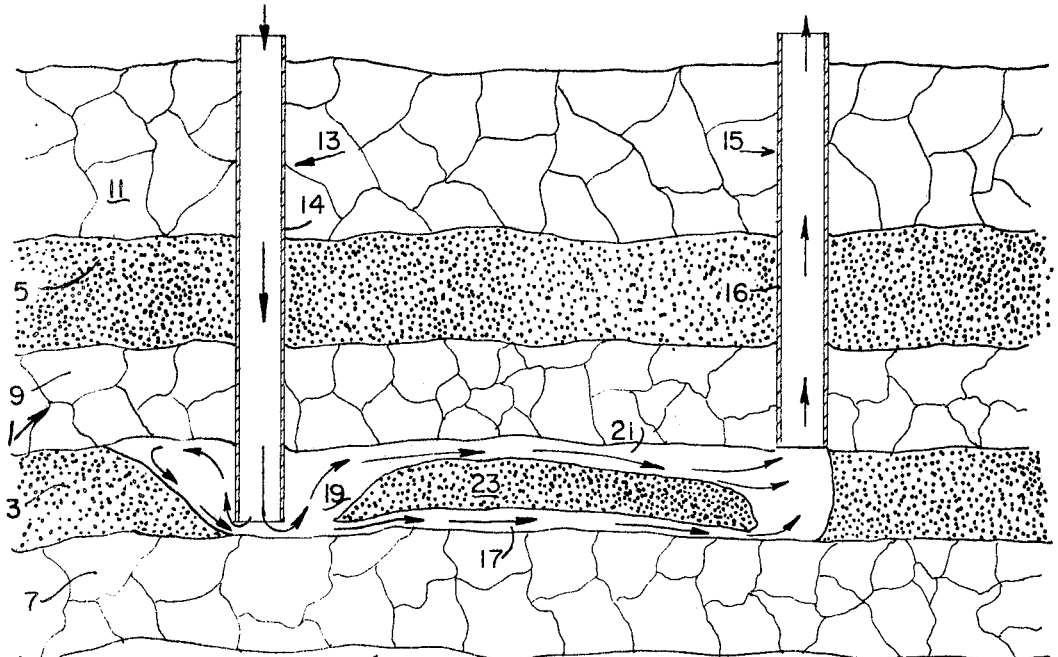
FIG. 1 is a diagrammatic vertical section illustrating a method of solution mining of a lower salt layer.

Referring now to the drawings, there is illustrated in FIG. 1 a subterranean section of a stratum 1 constituted by alternate horizontal layers or beds of soluble minerals 3 and 5 separated by layers or beds of substantially insoluble material 7, 9 and 11. The mineral layers 3 and 5 may consist of rock salt or other salt bearing materials and the layers 7, 9 and 11 of a rock such as limestone or dolomite. Although the invention will be described with reference to the mining of salt (NaCl) lying in subterranean layers separated by beds of rock, it should be understood that the invention is also applicable to the mining of other soluble minerals such a trona and potash.

As illustrated in FIG. 1, two wells 13 and 15 are drilled into lower salt bed 3, the wells terminating near the bottom thereof adjacent to lower rock layer 7. Wells 13 and 15 are suitably cased, as indicated at 14 and 16, and fluid communication is established between the wells in a conventional manner, as by hydraulically fracturing the formation by introduction of a fluid into the wells under sufficient pressure to cause parting of the bed substantially at or near the interface between lower bed 3 and underlying rock layer 7. This produces a passageway 17 extending between wells 13 and 15 at the bottom of salt layer 3. A dissolving fluid, such as fresh water, is then forced into well 13, hereinafter referred to as the injection well, for flow through passageway 17 and out well 15, hereinafter referred to as the production well. The water, in passing between the wells via passageway 17, dissolves the salt from layer 3 and produces a substantially salt saturated solution at the production well. The salt is recovered from the solution by any conventional method, such as by evaporation processes, or the solution may be utilized directly for electrolysis or other processes.

As the water flows from the injection well 13 to production well 15, it begins to dissolve the salt around well 13. Due to the lower specific gravity of the fresh water it works its way up to the roof of layer 3 generally in an up-dip direction, thereby gradually forming a cavity or gallery 19 which flares outwardly from the bottom toward the top of salt layer 3. As the salt dissolves, the cavity 19 increases in height reaching the rock layer 9 and then extending toward the production well 15 along the upper portion of the lower bed 3 as indicated at 21. Since salt water or brine is heavier than fresh water, a substantial portion of the fresh water entering cavity 19 from the injection well rises to the top of the cavity for passage through its extension or passageway 21 to the production well. The water, in traversing passageway 21, stratifies into relatively distinct layers of the heavier brine and lighter fresh water, with the result that the fresh water rises to the roof of the cavity and contacts the rock in layer 9 throughout its passage between the wells while the brine contacts the salt in bed 3 throughout its passage between the wells. Since the fresh water does not contact the salt, and the brine is at least partially saturated before contacting the salt, very little additional salt is dissolved as the water traverses cavity 19 and its passageway 21. Thus, when the substantially unsaturated fresh water and saturated brine mix in the cavity at the end of passageway 21 adjacent production well 15, the resulting solution produced at the output of the production well is not saturated and a short-circuit is said to occur in bed 3. Therefore, even though a substantial quantity of salt remains in the bed 3 between wells 13 and 15 as indicated by a dome-shaped mound at 23, when a short-circuit occurs in the salt layer, a saturated solution can no longer be produced from that layer and it is generally no longer economically feasible to continue to mine that layer. Thus, when short-circuiting occurs in a particular bed, the normal practice has been to discontinue mining in that bed, or to drill an offset well and attempt to establish communication between it and the cavity by fracturing, or to plug the wells and fracture across a substantially higher layer and begin the process over again, all of which are quite expensive procedures.

As illustrated in FIGS. 2–5, the method of this invention establishes fluid communication between the next higher salt bed and the previously mined lower salt bed to utilize the cavity formed in the lower salt bed as a conduit for delivery to the production well of the salt solution mined in the upper salt bed. This method of secondary recovery of the salt from the upper salt beds provides several unique advantages over conventional mining systems, such as caving the upper salt bed into the lower salt bed cavity by means of a third intermediate well or drilling offset wells and attempting a new fracture. For example, the present method may be utilized even in areas where the salt beds are separated by several hundred feet of solid rock. In addition, it eliminates the necessity and expense of drilling an additional well or wells and costly fracturing attempts, it avoids short-circuiting of the upper salt bed, and it removes a substantially greater quantity of salt per well drilled.

Figure 2:
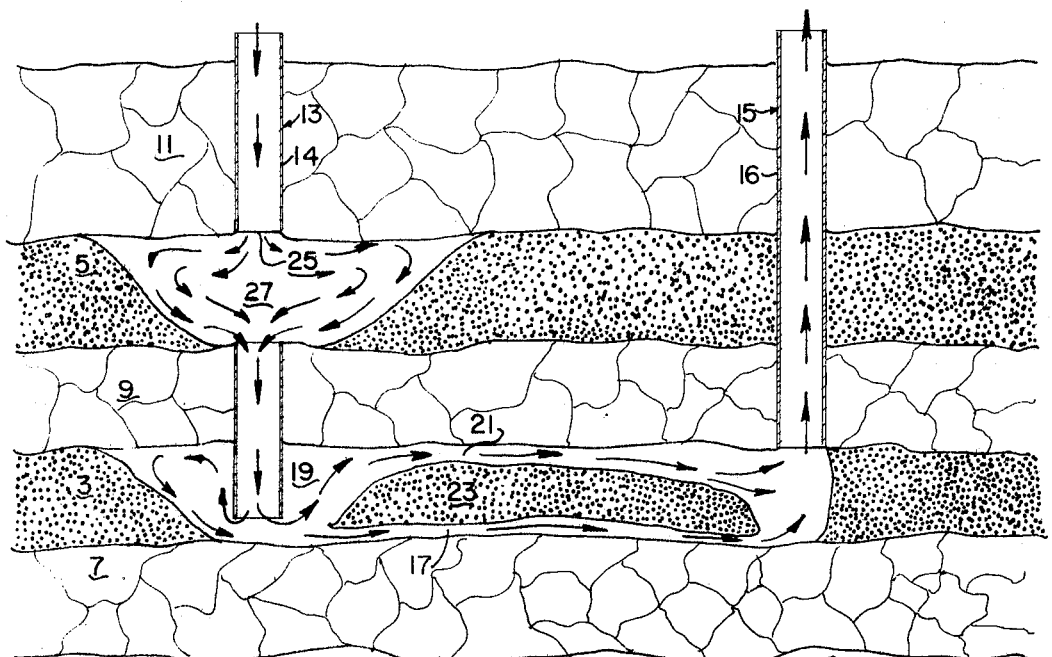
FIG. 2 is a view similar to FIG. 1 illustrating a first embodiment of a method of the present invention for solution mining.

Referring to FIG. 2, a first embodiment of the method of this invention comprises establishing communication between injection well 13 and salt bed 5 by removing a section of casing 14 in this bed. The casing may be removed in any conventional manner, such as milling it off, so as to permit the water forced into the injection well to exit the injection well at 25 in salt bed 5 for flow as indicated by the arrows. That is, as the water exits the end 25 of injection well 13 adjacent the top of salt layer 5, it rises to the roof of the bed because it is lighter than the brine already in the casing and cavity below the bed. As the water begins to dissolve the salt around the well, it becomes heavier than the fresh water exiting from the well and moves downwardly toward the bottom of the salt bed, dissolving salt throughout its passage until it is saturated and develops of cavity 27 having a "morning-glory" pattern. The fully satured solution, being heavier than the fresh water entering the cavity, continues to move downwardly and enters the lower section of casing 14 below bed 5 where it empties into cavity 19 formed in salt layer 3 for passage through passageways 17 and 21 to production well 15. It should be noted that since the solution is fully saturated from upper salt bed 5, no further dissolving occurs in lower bed 3, the latter being used solely as a conduit for passage of the saturated solution from the upper bed to the production well. Since the water does not pass laterally through the upper salt layer as it moves from the injection well to the inlet end of production well 15, cavity development in bed 5 can proceed almost indefinitely and without short-circuiting. Thus, a substantially greater quantity of the salt in the upper salt layer is removable by the method of this invention per well drilled and the substantial expense normally incurred in attempting other fractures and or further well drilling is eliminated.

Initiation of secondary recovery in accordance with the present invention, well in advance of short-circuiting of the lower salt layer, may be desirable under certain conditions. For example, if the lower salt layer is found to contain contaminants, such as sour gas, or potassium chloride in sodium chloride, it may be desirable to terminate solution mining in that layer well in advance of short-circuiting, and to initiate secondary recovery in a higher salt bed of higher purity as regards the undesirable contaminant. Thus, since full saturation is obtained in the upper salt layer, further dissolving in the lower salt layer would cease, thereby avoiding further contamination of the brine. The present method is also applicable to a situation where a high grade mineral bed (e.g., potash) has below it, separated by a rock layer, a bed of low grade ore (e.g., salt). By establishing the fracture initially in the salt bed and by forming a cavity therein, secondary recovery can be established in the upper potash bed using the cavity in the lower salt bed merely for conveyance of the potash solution to the production well. In this manner, short-circuiting in the potash bed is prevented and a more extensive recovery of potash per well drilled is effected. The present method also improves the quality of the brine under certain mining conditions. For example, it is known that calcium sulfate is more soluble in brine than it is in fresh water. Hence, if an upper salt bed of good quality has a rock layer above it containing calcium sulfate, the fresh water, rather than brine, rising to the roof of the salt bed will not dissolve large quantities of the calcium sulfate and calcium sulfate contamination of the brine will be reduced.

Figure 5:
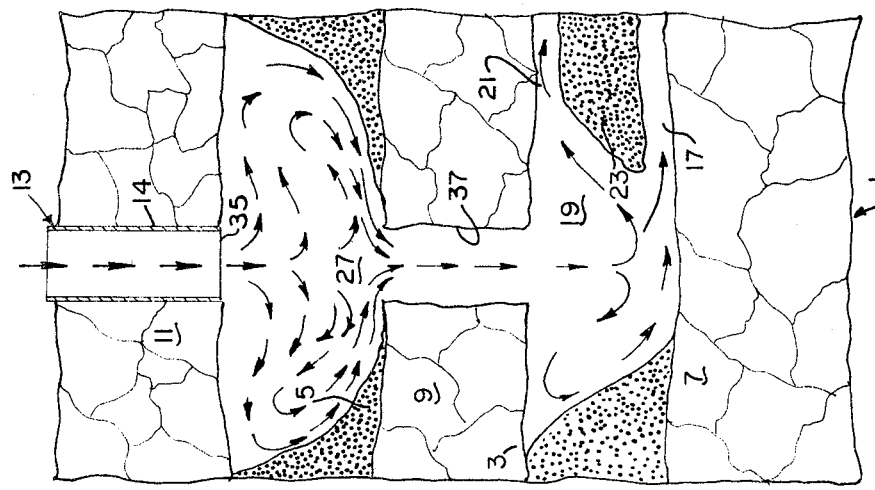
FIGS. 3–5 are partial diagrammatic views similar to FIG. 2 illustrating alternative embodiments of methods of this invention.
Figure 4:
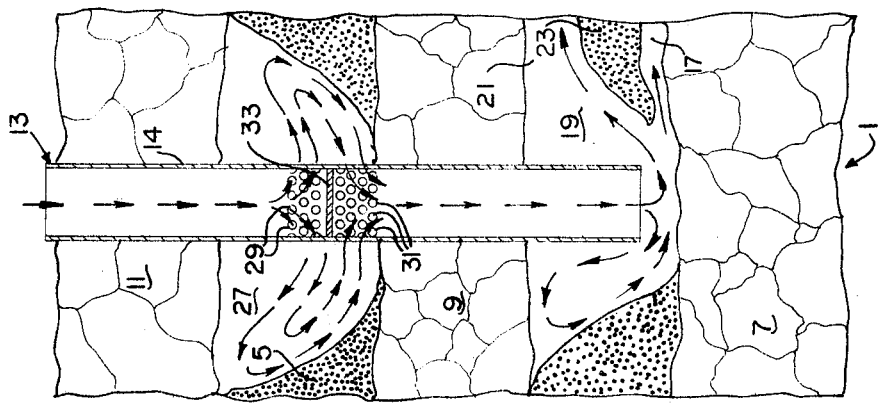
Figure 3:
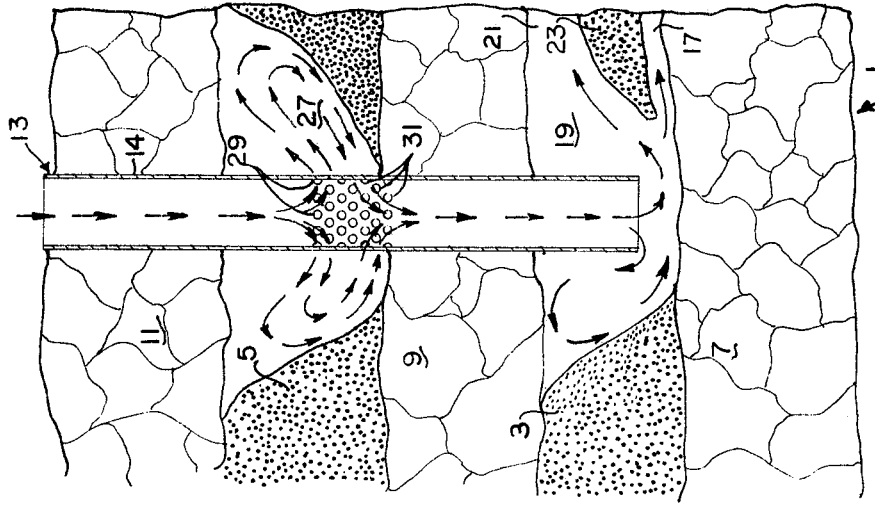

The embodiments of the invention illustrated in FIGS. 3–5 are exemplary of other methods of establishing communication between the injection well and the upper salt bed for secondary recovery of the salt therein either before or after short-circuiting or exhausting the salt in the lower bed. Referring to FIG. 3, a plurality of axially spaced perforations 29 and 31 are provided in the injection well casing 14 at the level of upper salt bed 5. This may be accomplished by any of several well known techniques, such as, for example, bullet or jet perforation systems. As indicated by the arrows, the lighter fresh water flows out the upper perforations 29 into bed 5 where it dissolves the salt therein and forms cavity 27. As the water dissolves the salt and becomes heavier, it flows down into the lower perforations 31 and through the well casing 14 below bed 5 to cavity 19 in bed 3, and thence through passageways 17 and 21 to the production well. Again, since the water becomes fully saturated in upper bed 5, no further dissolving occurs in bed 3 with the result that cavity 19 and passageways 17 and 21 are used solely for conveyance of the solution to the production well.

As illustrated in FIG. 4, a plug 33 is inserted in casing 14 of injection well 13 between upper and lower perforations 29 and 31. This insures that all of the fresh water entering the injection well will be diverted to upper bed 5, and permits an increased flow rate without forcing the water directly through the casing into lower bed 3.

In the FIG. 5 embodiment, injection well 13 is drilled into lower bed 3 and then cased only to the depth of upper bed 5. The well is then underreamed below the lower end 35 of the casing to enlarge the bore hole, as indicated at 37. A liner (not shown) is initially and temporarily set within the casing so as to extend down through the underreamed rock and into the portion of lower salt bed 3. After fracturing through this liner and circulation of the fluid solute through it to wash the lower bed, the liner is removed and injection of the water through the casing 14 can proceed. Alternately, the fracturing can be effected from well 15 and initially the system is operated with well 15 being used as the injection well and well 13 as the production well. When washing is stopped the flow is reversed, and well 13 is utilized as the injection well with well 15 thereafter serving as the production well.

Thus, the methods of this invention utilize a heretofore useless cavity formed in a lower mineral bed as a conduit for the passage of a mineral saturated solution from a higher mineral bed. Since the solution is fully saturated prior to entry into the lower cavity, no further substantial dissolving occurs in the lower mineral bed. Hence, the brine from the production well will contain a minimum of contaminants which may exist in the lower bed and which are less soluble in brine than in fresh water. Additionally, since communication is not established between the injection and production wells in the upper mineral layer, short-circuiting of that layer is avoided and a greater quantity of the mineral therein can be removed per well drilled. The present methods are also simple to perform and economical to operate.

In view of the above, it will be seen that the several objects of this invention are achieved and other advantageous results attained.

As various changes could be made in the above methods without departing from the scope of the invention, it is intended that all matter contained in the above description or shown in the accompanying drawings shall be interpreted as illustrative and not in a limiting sense.

What is claimed is:

1. The method of solution mining soluble minerals lying in a plurality of subterranean beds separated by layers of substantially insoluble material comprising the steps of drilling spaced injection and production wells into a lower mineral bed; establishing fluid communication between the wells; forcing a fluid from the injection well to the production well to dissolve the mineral in the lower bed and to produce a substantially mineral saturated solution at the production well, said fluid gradually forming a cavity in the lower mineral bed extending toward the production well along the upper portion of the lower bed to cause a short-circuit between the wells; establishing fluid communication between the injection well and a second, higher mineral bed for circulation of the fluid from the injection well to the second bed; dissolving the mineral in the second bed to produce a fully mineral saturated solution from that bed; returning the fully mineral saturated solution from the second bed to the portion of the injection well between the higher and lower beds; and removing said fully mineral saturated solution through said portion of the injection well, the cavity and the production well without further dissolution of minerals from the lower bed whereby the cavity in the first mineral bed is used as a conduit for removal of the solution from the second mineral layer thereby minimizing the need for drilling additional wells and further fracturing between wells.

2. The method of claim 1 wherein the injection well is provided with a casing and fluid communication is established between the injection well and the second mineral bed by perforating the casing at axially spaced points in the second bed.

3. The method of claim 2 further comprising the step of plugging the casing between the axially spaced perforations.

4. The method of claim 1 wherein the injection well is provided with a casing and fluid communication is established between the injection well and the second mineral bed by milling the casing off to remove a section thereof in the second bed.

5. The method of claim 1 wherein fluid communication is established between the injection well and the second mineral bed by providing a casing in the injection well, said casing terminating adjacent the top portion of the second mineral bed.

6. The method of claim 1 wherein fluid communication between the injection well and the second mineral bed is established after dissolving substantially all of the removable mineral in the cavity in the lower mineral bed.

7. The method of claim 1 wherein fluid communication between the injection well and the second mineral bed is established prior to dissolving all of the removable mineral in the cavity in the lower mineral bed, whereby dissolving of soluble contaminants in the lower mineral bed is substantially reduced.

8. The method of claim 1 wherein the first and second minerals are salt.

9. The method of claim 1 wherein the lower mineral bed comprises a relatively low grade mineral and the second mineral bed comprises a relatively high grade mineral.

10. The method of claim 9 wherein the mineral in the lower bed is predominantly salt and that in the second bed comprises potash.

References Cited

UNITED STATES PATENTS

| | | | |
|---|---|---|---|
| 3,262,741 | 7/1966 | Edmonds et al. | 299—4 |
| 3,405,974 | 10/1968 | Hundley et al. | 299—4 |

ERNEST R. PURSER, Primary Examiner